(12) United States Patent
Syrivelis et al.

(10) Patent No.: US 11,711,210 B2
(45) Date of Patent: Jul. 25, 2023

(54) QUANTUM KEY DISTRIBUTION-BASED KEY EXCHANGE ORCHESTRATION SERVICE

(71) Applicant: MELLANOX TECHNOLOGIES, LTD., Yokneam (IL)

(72) Inventors: Dimitrios Syrivelis, Volos (GR);
Paraskevas Bakopoulos, Ilion (GR);
Ioannis (Giannis) Patronas, Piraeus (GR); Elad Mentovich, Tel Aviv (IL);
Dotan David Levi, Kiryat Motzkin (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/227,321

(22) Filed: Apr. 11, 2021

(65) Prior Publication Data
US 2022/0209943 A1    Jun. 30, 2022

(30) Foreign Application Priority Data

Dec. 28, 2020 (GR) .............................. 20200100752

(51) Int. Cl.
| | |
|---|---|
| *H04L 9/08* | (2006.01) |
| *H04L 9/40* | (2022.01) |
| *G06N 10/00* | (2022.01) |
| *G06F 12/14* | (2006.01) |

(52) U.S. Cl.
CPC ........ *H04L 9/0858* (2013.01); *G06F 12/1408* (2013.01); *G06N 10/00* (2019.01); *H04L 63/061* (2013.01); *G06F 2212/1052* (2013.01)

(58) Field of Classification Search
None
See application file for complete search history.

(56) References Cited

U.S. PATENT DOCUMENTS

| | | | |
|---|---|---|---|
| 9,077,577 B1 * | 7/2015 | Ashrafi | ................. H04L 27/366 |
| 9,356,780 B2 * | 5/2016 | Tanizawa | ................ H04L 63/06 |
| 11,451,308 B1 * | 9/2022 | Bucklew | ................ H04B 10/70 |

(Continued)

OTHER PUBLICATIONS

Shor, "Algorithms for quantum computation: discrete logarithms and factoring", Proceedings of the 35th Annual Symposium on Foundations of Computer Science, vol. 1, pp. 124 134, Nov. 20-22, 1994.

(Continued)

*Primary Examiner* — Sanchit K Sarker
(74) *Attorney, Agent, or Firm* — Kligler & Associates Patent Attorneys Ltd

(57) ABSTRACT

In one embodiment, a secure computing system comprises a key generation sub-system configured to generate cryptographic keys and corresponding key labels for distribution to computer clusters, each computer cluster including a plurality of respective endpoints, a plurality of quantum key distribution (QKD) devices connected via respective optical fiber connections, and configured to securely distribute the generated cryptographic keys among the computer clusters, and a key orchestration sub-system configured to manage caching of the cryptographic keys in advance of receiving key requests from applications running on ones of the endpoints, and provide respective ones of the cryptographic keys to the applications to enable secure communication among the applications.

17 Claims, 7 Drawing Sheets

(56) References Cited

U.S. PATENT DOCUMENTS

| | | |
|---|---|---|
| 2005/0078826 A1 | 4/2005 | Takeuchi |
| 2006/0013396 A1 | 1/2006 | Kollmitzer |
| 2008/0165957 A1* | 7/2008 | Kandasamy ........ G06F 21/6218 |
| | | 713/175 |
| 2008/0175385 A1 | 7/2008 | Lee et al. |
| 2008/0292095 A1 | 11/2008 | Vig et al. |
| 2009/0180615 A1 | 7/2009 | Trifonov |
| 2012/0177201 A1 | 7/2012 | Ayling et al. |
| 2013/0101119 A1* | 4/2013 | Nordholt ............... H04L 9/0852 |
| | | 380/278 |
| 2017/0214525 A1* | 7/2017 | Zhao ................. H04W 12/0431 |
| 2019/0123847 A1 | 4/2019 | Bush et al. |
| 2019/0379463 A1 | 12/2019 | Shields et al. |
| 2021/0083864 A1 | 3/2021 | Bush |
| 2022/0006627 A1* | 1/2022 | Ko ........................... H04L 9/14 |

OTHER PUBLICATIONS

Mentovich et al., U.S. Appl. No. 17/155,881, filed Jan. 21, 2021.
U.S. Appl. No. 17/155,881 Office Action dated Apr. 26, 2023.

\* cited by examiner

QUANTUM KEY DISTRIBUTION-BASED KEY EXCHANGE ORCHESTRATION SERVICE

RELATED APPLICATION INFORMATION

The present application claims priority from Greek Patent Application number 20200100752 filed Dec. 28, 2020, the disclosure of which is hereby incorporated herein by reference.

FIELD OF THE INVENTION

The present invention relates to computer systems, and in particular, but not exclusively to, secure key distribution.

BACKGROUND

The cornerstone of symmetric and public key cryptography applications is the secure key exchange approach and algorithms, i.e., how the involved endpoints agree on which key to use to appropriately encrypt/decrypt data. If the key exchange security is broken, an eavesdropper can acquire the about-to-be-applied encryption keys during the key exchange process and thus render any cryptography algorithm useless. In addition, given the millions of active secure connections that today's datacenter endpoints need to concurrently support, a key exchange approach does not only need to be secure but also pervasive and scalable.

These are the main reasons Internet Key Exchange (IKE) protocol prevails today for MacSec (Open System Interconnection (OSI) Layer 2) and IPsec (OSI Layer 3) symmetric key cryptography and is realized in a variety of IETF features a few phases for key exchange. The first and most important one is the initial key exchange that takes place via the Diffie-Hellman (DH) algorithm. After DH-based key exchange, the secure channel established is further used for subsequent and faster key updates. All steps of IKE are application-level (OSI Layer 7) and are materialized as a daemon that establishes and controls one or more secure channels between two or more endpoints. Layer 2 and 3 encryption approaches typically need to establish a few hundred or thousand channels per datacenter instance.

Moreover, an approach similar to DH acts as the basis for Transport Layer Security (TLS) (OSI Layer 4). The TLS model relies on public key cryptography and the dominating algorithm is RSA. At Layer 4, where millions of connections can be concurrently realized between different datacenter sites, the key exchange process is integral to each application and takes place on a per connection establishment basis.

Notably, both of the above-described approaches generate and exchange keys on demand the very moment the cryptography applications request them.

Quantum Key Distribution (QKD) provides a quantum safe alternative for Internet key exchange between different end points. Based on the physics behind quantum optics, QKD leverages an optical communication channel as the medium to safely exchange a key-label pair with a remote end point, with instant and theoretically proven eavesdropper detection.

With the advent of real-life quantum computer prototypes, mathematical problems like integer factorization and discrete logarithm are now easy to solve with Shor's algorithm (Shor, P. W. (1994). "Algorithms for quantum computation: discrete logarithms and factoring". Proceedings 35th Annual Symposium on Foundations of Computer Science. IEEE Comput. Soc. Press: 124-134. doi:10.1109/sfcs.1994.365700. ISBN 08186(5807). Subsequently, DH key exchange and public key cryptography are considered broken in the post-quantum era which is quickly approaching. Moreover, symmetric key encryption security is halved by quantum computers and thus very frequent key updates are required. Therefore, QKD seems a promising solution.

Unlike current Key exchange approaches that are materialized entirely in software and use commodity network services TCP and UDP packets), QKD uses specialized hardware and provides a more centralized facility for key exchange. Due to costs and size of the current QKD devices, it is highly unlikely that QKD hardware will be part of every NIC and switch port in the near to medium future. QKD-enabled devices feature a dedicated network interface that can be accessed in a datacenter trusted zone and an OSI layer 6 protocol, which are used to retrieve keys paired with universally unique identifiers (UUIDs) that serve as labels and have been safely exchanged with specific remote endpoints.

In addition, todays QKD devices are capable of exchanging a few thousands LILTED-key pairs per second, which, together with the fact that they are a more centralized resource, can be borderline for the high demand periods.

SUMMARY

There is provided in accordance with an embodiment of the present disclosure, a secure computing system, including a key generation sub-system configured to generate cryptographic keys and corresponding key labels for distribution to computer clusters, each computer cluster including a plurality of respective endpoints, a plurality of quantum key distribution (QKD) devices connected via respective optical fiber connections, and configured to securely distribute the generated cryptographic keys among the computer clusters, and a key orchestration sub-system configured to manage caching of the cryptographic keys in advance of receiving key requests from applications running on ones of the endpoints, and provide respective ones of the cryptographic keys to the applications to enable secure communication among the applications.

Further in accordance with an embodiment of the present disclosure the key orchestration sub-system includes, in each respective computer cluster, a key cache orchestrator and a key exchange orchestrator.

Still further in accordance with an embodiment of the present disclosure the key cache orchestrator is configured to monitor a level of available cryptographic keys in a respective one of the computer clusters, and request the key generation sub-system to generate additional cryptographic keys and corresponding labels responsively to the monitored level.

Additionally, in accordance with an embodiment of the present disclosure the key exchange orchestrator is configured to manage provision of cached cryptographic keys to applications running on respective ones of the endpoints in the computer clusters responsively to corresponding ones of the labels.

Moreover, in accordance with an embodiment of the present disclosure the key exchange orchestrator of a first one of the computer clusters is configured to communicate with the key exchange orchestrator of a second one of the computer clusters to manage the provision of one or more of the cached cryptographic keys to applications running on endpoints in the first and second computer clusters.

Further in accordance with an embodiment of the present disclosure the key exchange orchestrator of the first computer cluster is configured to communicate with the key exchange orchestrator of the second computer cluster to manage provision of the one or more cryptographic keys using the labels of the one or more cryptographic keys.

Still further in accordance with an embodiment of the present disclosure the key exchange orchestrator of the first computer cluster and the key exchange orchestrator of the second computer cluster are configured to manage the provision of the one or more cached cryptographic keys to applications running on the endpoints in the first and second computer clusters such that an encryption key of the one or more cached cryptographic keys is not provided to one of the endpoints until a decryption key corresponding with the encryption key is provided to another one of the endpoints.

Additionally, in accordance with an embodiment of the present disclosure the key exchange orchestrator of the first computer cluster and the key exchange orchestrator of the second computer cluster are configured to provide ones of the cached cryptographic keys to the applications running on the endpoints in the first and second computer clusters using key queues in which respective ones of the cached cryptographic keys are queued in a first key queue in the first computer cluster and in a second key queue in the second computer cluster.

Moreover, in accordance with an embodiment of the present disclosure the key exchange orchestrator of the first computer cluster is configured to provide one of the cached cryptographic keys having a first corresponding one of the labels to a first application running on a first one of the endpoints in the first computer cluster responsively to at least one detail about a communication between the first application and a second application running on a second one of the endpoints in the second computer cluster, and the key exchange orchestrator of the second computer cluster is configured to provide one of the cached cryptographic keys to the second application responsively to receiving the first label and the at least one detail from the key exchange orchestrator of the first computer cluster, and the at least one detail from the second application.

Further in accordance with an embodiment of the present disclosure the key exchange orchestrator of a first one of the computer clusters is configured to provide one of the cached cryptographic keys and a first corresponding one of the labels to a first application running on a first one of the endpoints in the first computer cluster, and the key exchange orchestrator of a second one of the computer clusters is configured to provide one of the cached cryptographic keys to a second application running on a second one of the endpoints in the second computer cluster responsively to receiving the first label from the second application, which received the first label from the first application.

There is also provided in accordance with another embodiment of the present disclosure, a secure key distribution system, including a plurality of quantum key distribution (QKD) devices configured to distribute cryptographic keys, at least one optical switch configured to switch beams of light which are modulated to carry information, and optical fibers connecting the at least one optical switch and the QKD devices forming an optically-switched communication network, over which optical circuit connections are established between pairs of the QKD devices over respective ones of the optical fibers via the at least one optical switch, the optically-switched communication network including the QKD devices and the at least one optical switch.

Still further in accordance with an embodiment of the present disclosure, the system includes a key orchestration sub-system including a key cache orchestrator configured to monitor a level of available cryptographic keys, request a key generation sub-system to generate additional cryptographic keys, and configure the at least one optical switch so as to allow distribution of the additional cryptographic keys by ones of the QKD devices via the at least one optical switch.

There is also provided in accordance with yet another embodiment of the present disclosure, a secure computing system, for use with a plurality of computing sub-systems, each computing sub-system including a plurality of endpoints, the secure computing system comprising a key generation sub-system configured to generate cryptographic keys and corresponding key labels for distribution to the computer sub-systems, a plurality of quantum key distribution (QKD) devices connected via respective optical fiber connections, and configured to securely distribute the generated cryptographic keys among the computer sub-systems, and a key orchestration sub-system configured to manage caching of the cryptographic keys in advance of receiving key requests from applications running on ones of the endpoints, and provide respective ones of the cryptographic keys to the applications to enable secure communication among the applications.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
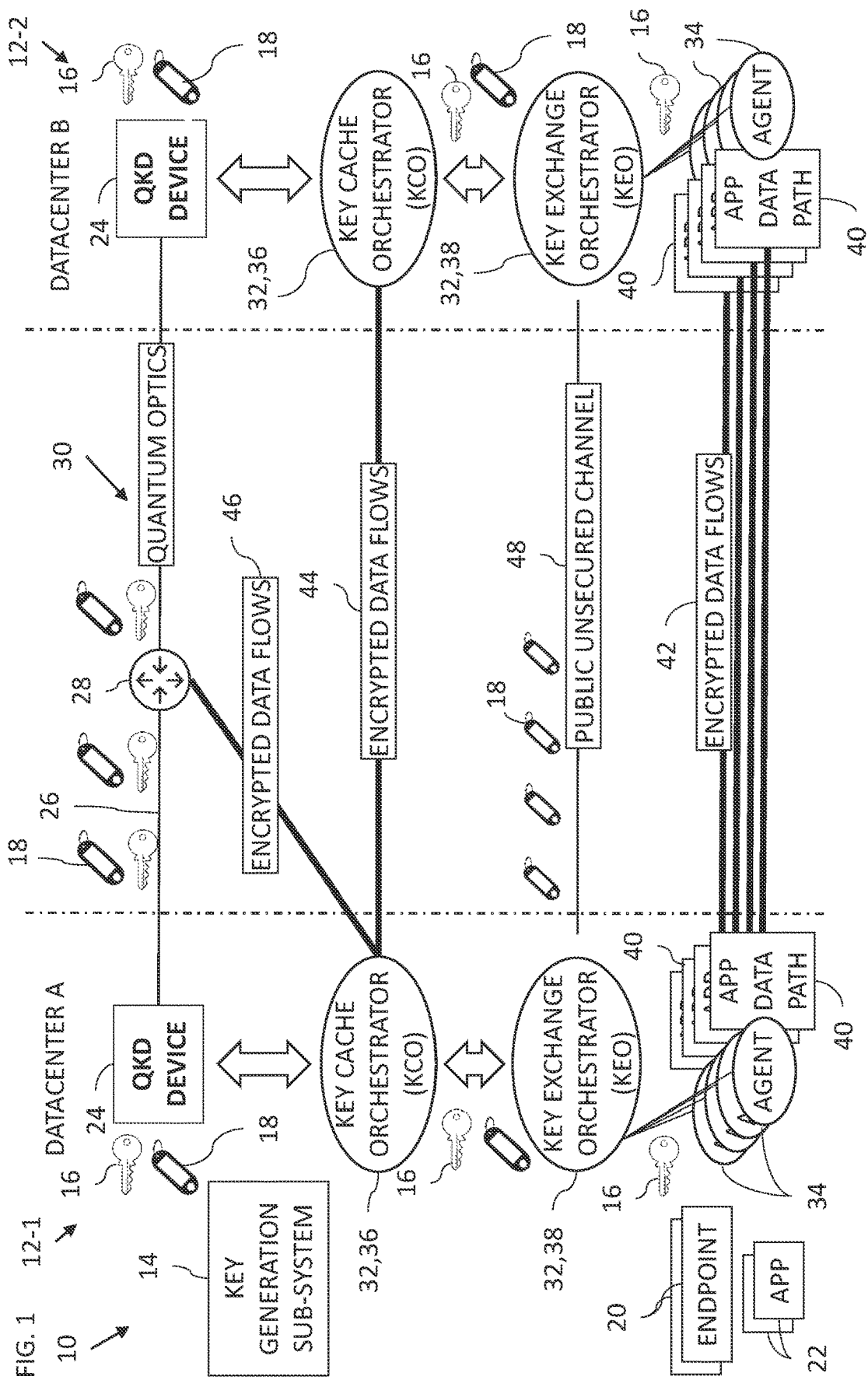
FIG. 1 is a block diagram of a QKD orchestration system constructed and operative in accordance with an embodiment of the present invention.

QKD is very new technology and all current efforts focus on QKD quantum channel improvements to optimize the stability of the service, the increase of key exchange rate and also enable the concurrent transmission of data over the same fiber that will decrease TCO. A basic interface has been standardized (QKD 014 ETSI standard) which enables software entities in a datacenter trusted zone to retrieve QKD-exchanged keys paired with QKD-link-level UUIDs via a REST API from the locally attached QKD device. Subsequently, the security applications residing behind the end points between which QKD key exchanges take place, are expected to agree on which keys to use by exchanging the UUIDs over a public channel. Notably, an eavesdropper may steal the UUIDs but does not have any information on what to do with them.

However, the above basic functionality does not really consider the current security context and requirements of the respective encryption applications. First, modern datacenters may be concurrently connected to many sites leveraging many QKD devices. Each encryption application may need to know many details about a specific datacenter infrastructure deployment in order to connect to the correct QKD device and use the standardized API that is currently provided. Typically, orchestration software abstracts the datacenter infrastructure deployment details and cannot securely make such information available e.g., to cryptographic applications that belong to a third party that rents resources.

Also, deploying the encryption keys to the actual encrypter or decrypter data-path may require several more steps which are not currently supported by QKD devices. In practice, all applications may need to: apply the same key to the encryption and decryption side of their data-path; agree on what that key will be; and, if they want to support online update of keys, coordinate the key installation so that first the decrypter-side is installed and the encrypter-side follows.

ETSI Q004 standard defines an interface between applications and a key management layer, without specifying any details of the architecture and basic functionality of the latter. What is more important, existing approaches consider QKD-based key exchange as an alternative of current software-based approaches which generate and exchange keys on demand. While there is some proactive key exchange occurring at the level of the QKD devices, it is not sufficient to provide keys on time, given the demand on modern datacenters and current QKD key exchange rate performance.

As previously mentioned, QKD systems provide a very secure key exchange mechanism. Nevertheless, this is the only service provided by QKD systems and there are several challenges. Embodiments of the present invention solve the above problems in order to integrate QKD with up-to-date datacenter cryptography applications and meet demand requirements.

Embodiments of the present invention solve the above problems by providing an orchestration architecture which precaches cryptographic keys for future use by applications running on endpoints in different datacenters to communicate in a secure fashion by using the precached cryptographic keys to encrypt and decrypt data being transferred among the different endpoints. The embodiments described herein use the term "datacenter". The embodiments are not limited to use with datacenters, but may also be implemented with any suitable computer sub-system, or computer cluster, such as a collection of edge nodes.

Cryptographic keys and corresponding UUID labels (which may be used to identify the keys) may be generated by a key generation sub-system in one or more of the data centers and then distributed securely using QKD systems to provide secure key exchange among the datacenters. The keys and corresponding UUID labels are distributed using the QKD devices installed in each datacenter over a secure network such as an optical network. The QKD devices may be connected in a one-to-one manner over dedicated optical cables, or over an optically switched network including one or more optical switches to connect the QKD devices as needed. The switching of the optical switch(es) may be controlled by a network controller which is in turn controlled according to the key caching needs among the datacenters, for example, by a KCO described in more detail below.

It should be noted that the keys include symmetric cryptographic keys in which each side of a communication uses the same key for encryption and decryption, and/or asymmetric cryptographic keys in which a key pair is provided with one key being used for encryption and another key being used for decryption.

The keys and corresponding UUID labels may be distributed by the QKD devices in such a way that each datacenter has respective sets of keys for communication with respective datacenters or with respective groups of data centers. For example, datacenter A may have a set of keys for communication with datacenter B, which has the same set of keys, and a different set for communication with datacenter C, etc. Additionally, or alternatively, datacenters A, B and C may each have the same set of keys for allowing communication among datacenters A, B, and C, or a subset thereof. In some embodiments, the same set of keys may be supplied to each datacenter in the system so that a key may be selected by any two or more datacenters for communication therebetween.

Each datacenter includes a cryptography key management orchestration service, which includes a Key Cache Orchestrator (KCO). The KCO caches keys generated by the local key generation sub-system or received from another key generation sub-system via the network of QKD devices. The KCOs may exchange UUID labels in order to confirm that keys in the possession of one KCO are also held by another KCO (or other KCOs). If the UUID is not found by one (or more) KCO, the keys associated with that UUID may be invalidated by other KCO(s).

In some embodiments, the KCO monitors the level of available cryptographic keys in its datacenter (for example, either on a total basis or by the number of available keys for communication with each other datacenter or group of datacenters) and requests that keys (and corresponding UUID labels) are appropriately generated by the local key generation sub-system for distribution by the QKD devices among the datacenters to maintain an adequate advance supply of cached cryptographic keys. In some embodiments, the KCO may request additional keys (and corresponding UUID labels) to be generated by the key generation sub-system of another datacenter for distribution by the QKD devices.

In some embodiments, the KCO configures one or more of the optical switches of the optically switched network so as to allow distribution of cryptographic keys by ones of the QKD devices via the configured optical switch(es).

The cryptography key management orchestration service of each data center also includes Key Exchange Orchestrator (KEO), which manages provision of cached keys to applications running of endpoints. The KEO may run a service with agents in order to distribute the cached keys to the applications. In this manner keys may be provided by the respective KEOs to two applications running on two different respective endpoints in two different respective datacenters to enable secure communication between the respective endpoints.

The KEO of one datacenter may communicate with the KEO of other datacenters to manage provision of one or more cache keys to applications in the different datacenters. The KEOs do not communicate the keys themselves but indicate the keys to be shared using the corresponding UUID For example, application 1 in datacenter A may request a cryptographic key from the KEO of datacenter A for communicating with application 2 in datacenter B. The request to the KEO of datacenter A by application 1 may include one or more details about the communication (e.g., connection or session details, application ID, endpoint ID, destination ID such as destination MAC or IP address etc.). The KEO of datacenter A may then request a key from the KCO of datacenter A, which retrieves a key and corresponding UUID, and provides the retrieved key and UUID to the KEO, which provides the retrieved key to application 1. The KEO of datacenter A provides the UUID to the KEO of datacenter B along with one or more details about the communication. The KEO of datacenter B then requests the corresponding key from the KCO of datacenter B responsively to the received UUID. The KEO of datacenter B may then provide the retrieved key to application 2 either by pushing the key to application 2 (based on the received details from the KEO of datacenter A) or in response to a key request from application 2.

In some embodiments, the KEO of datacenter A may provide the retrieved key and corresponding UUID to application 1. Application 1 may then provide the UUID to application 2, which requests the corresponding key from the KEO of datacenter B using the provided UUID. The KEO retrieves the key from the KCO responsively to the provided UUID and the provides the key to application 2.

In some embodiments, the KEOs provide keys such that an encryption key is not provided to an application of a first endpoint involved in communication with an application of another endpoint until a corresponding decryption key has been provided to the application of the other endpoint.

In some embodiments, the KEOs retrieve multiple keys which are assigned to queues for specific applications so that when communicating applications want to renew keys, the applications may retrieve the keys from the queues. In some embodiments, decryption keys are pulled from respective queues by respective application(s) and corresponding encryption keys are pushed from their respective queues by the respective KEOs in response to the decryption keys being pulled from their respective queues.

Embodiments of the present invention protect a datacenter service architecture by scaling-out the current QKD device-provided service by introducing a datacenter wide distributed orchestration service that abstracts all available physical QKD point-to-point links.

Embodiments of the present invention take over and abstract away interactions and coordination that is to be performed before a given encryption application can install the keys in its encrypter or decrypter data-path endpoint. For remote orchestration service endpoint coordination communications over public internet, the service leverages QKD-provided keys for authentication and encryption of exchanged messages for Layer 4 Secure Socket Layer instead of mainstream public key cryptography algorithms like RSA.

Embodiments provide innovative support for automated key refresh in symmetric key cryptography applications, a caching layer that proactively performs QKD-based key exchanges and populates appropriately caches at different datacenter sites, to deal with periods where the key demand is higher than the QKD key exchange bandwidth, and/or introduces an intelligent control plane that centrally manages the caching layer across many datacenters and leverages artificial intelligence (AI) approaches to improve the decisions on which datacenter caches to fill and when, trained on the traces of previous application demand.

Disclosed embodiments define a software-defined optical circuit network architecture that is driven by the caching layer control plane and allows QKD end points to get dynamically interfaced and exchange keys according to the key cache population schemes. The approach dramatically decreases the number of QKD devices that are required per site and improves the total cost of ownership (TCO).

In some embodiments, the key exchange orchestration central core interacts with the caching layer to pull QKD-exchanged keys and features lightweight agents that can be flexibly materialized as daemons or libraries for cryptography applications to use. This way the service agents may also execute on switch control plane processors as well as smartNICs that need to establish secure channels with remote counterparts.

In some embodiments, the protected orchestration service abstracts away the QKD device infrastructure deployment from applications and makes key exchange service pervasively available to each and every application that runs on the datacenters no matter the privileges.

Embodiments of the present invention build on top of QKD and provide a solution to the challenges described above, introducing an end-to-end architecture for cryptography key management for inter-datacenter communications that is amenable to integration with modern hybrid cloud resource orchestration services.

Embodiments of the present invention introduce a key exchange service architecture that runs as part of the orchestration stack, at datacenter scale, and builds on top of QKD basic endpoint key exchange support. In the context of the hybrid cloud, more and more on-premise and off-premise infrastructures need to be combined and safely communicate over public internet, which rapidly increases the numbers of concurrent secure site-to-site dataflows. Embodiments of the present invention are particularly focused to these scenarios, where paramount security is needed and secure key exchange is pervasive. In this context the QKD quantum safe key exchange management needs to be scalable, fault tolerant and provide quality of service (QoS) guarantees.

QKD device support provides an interface to retrieve the keys that have been exchanged with a designated counterpart QKD device at a remote endpoint. A link-level UUID label for each key is also provided so security applications behind the endpoints may agree on which keys to use. A generic interface between applications and an abstract key management layer is also defined.

Embodiments of the present invention provide a protected service architecture which abstracts QKD device access from applications, continuously pulls QKD exchanged keys from QKD devices to a caching layer and distributes them to associated security applications. Most importantly, the keys are delivered to applications as ready-to-install without requiring any further application-side coordination interactions. Also, taking advantage of the intelligence of the caching layer, the key exchange service can flexibly interface remote QKD devices via a software defined control plane and an optical switch to significantly reduce the number of QKD devices and fiber links required, down to a minimum of one per site, which significantly improves TCO.

Embodiments of the present invention provide secured and pervasive key exchange orchestration service for cryptography applications that span all OSI Layer stack such as OSI Layer 7 user applications (e.g., SmartNICs), OSI Layer 4 (transport) (e.g., SmartNICs), OSI Layer 3 (routing) (e.g., SmartNICs and Switches), and OSI Layer 2 (forwarding) (e.g., SmartNICs and Switches), by way of example only.

Embodiments introduce an intelligent key caching layer, which enables proactive caching of QKD-exchanged keys. It also drives a Software-defined Optical Circuit Switch plane that dynamically interfaces remote QKD devices, to proactively exchange keys and fill up the caches according to demand. The approach enables the scalable exploitation of QKD-based key exchange while reducing TCO.

System Description

Reference is now made to FIG. 1, which is a block diagram of a QKD orchestration system 10 constructed and operative in accordance with an embodiment of the present invention. The QKD orchestration system 10 is an example of a secure computing system. The QKD orchestration system 10 is implemented over a plurality of computer clusters 12 or computer sub-systems. A data center is an example of a computer cluster 12. By way of example, FIG. 1 shows two computer clusters 12, computer cluster 12-1 (also referred to as datacenter A) and computer cluster 12-2 (also referred to as datacenter B).

The QKD orchestration system 10 includes a key generation sub-system 14 configured to generate cryptographic keys 16 (only some labeled for the sake of simplicity) and corresponding key labels 18 (e.g., UUIDs) (only some labeled for the sake of simplicity) for distribution to computer clusters 12. The key generation sub-system 14 may be disposed in one of the computer clusters 12, or among two or more of the computer clusters 12.

Each computer cluster 12 includes a plurality of respective endpoints 20. FIG. 1 only shows the endpoints 20 in computer cluster 12-1 for the sake of simplicity. Each endpoint 20 is configured to run one or more software applications 22 (also only shown in computer cluster 12-1 for the sake of simplicity).

The QKD orchestration system 10 includes a plurality of QKD devices 24 connected via respective optical fiber connections 26, and configured to securely distribute (e.g., via a quantum optics method) the generated cryptographic keys 16 and corresponding key labels 18 among the computer clusters 12.

The QKD devices 24 may be connected in a one-to-one manner over the dedicated optical fiber connections 26, or over an optically switched network. In some embodiments, the QKD orchestration system 10 may include one or more optical switches 28 configured to switch beams of light which are modulated to carry information, with the optical fiber connections 26 connecting the optical switch(es) 28 and the QKD devices 24 forming an optically-switched communication network 30, over which optical circuit connections are established between pairs of the QKD devices 24 over respective ones of the optical fiber connections 26 via the optical switch(es) 28. The switching of the optical switch(es) may be controlled by a network controller which is in turn controlled according to the key caching needs among the datacenters, for example, by a KCO 36 described in more detail below.

It should be noted that the keys 16 include symmetric cryptographic keys in which each side of a communication uses the same key for encryption and decryption, and/or asymmetric cryptographic keys in which a key pair is provided with one key being used for encryption and another key being used for decryption.

The keys 16 and corresponding key labels 18 may be distributed by the QKD devices 24 in such a way that each computer cluster 12 has respective sets of keys for communication with respective computer clusters 12 or with respective groups of data centers. For example, datacenter A may have a set of keys 16 for communication with datacenter B, which has the same set of keys 16, and a different set for communication with datacenter C, etc. Additionally, or alternatively, datacenters A, B and C may each have the same set of keys 16 for allowing communication among datacenters A, B, and C, or a subset thereof. In some embodiments, the same set of keys 16 may be supplied to each datacenter in the system so that a key may be selected by any two or more datacenters for communication therebetween.

The QKD orchestration system 10 includes a key orchestration sub-system. 32 configured to manage caching of the cryptographic keys 16 in advance of receiving key requests from applications 22 running on ones of the endpoints 20. The key orchestration sub-system 32 is also configured to provide respective ones of the cryptographic keys 16 to the applications 22 (or agents 34 of the applications 22) to enable secure communication among the applications 22.

The key orchestration sub-system 32 includes, in each respective computer cluster 12, the key cache orchestrator (KCO) 36 and a key exchange orchestrator (KEO) 38.

In some embodiments, the key cache orchestrator 36 in each respective computer cluster 12 is configured to manage caching of the cryptographic keys 16 (generated by a local key generation sub-system 14 or received from another key generation sub-system 14 in the QKD orchestration system 10 via the QKD device(s) 24) in advance of receiving key requests from applications 22 running on ones of the endpoints 20 in that computer cluster 12. In other words, the key cache orchestrator 36 is configured to manage caching of the cryptographic keys 16 in the computer cluster 12 of that key cache orchestrator 36. The key cache orchestrator 36 is configured to: monitor a level of available cryptographic keys 16 in a respective one of the computer clusters 12 (i.e., in the computer cluster 12 of that key cache orchestrator 36) (for example, either on a total basis or by the number of available keys 16 for communication with each other computer cluster 12 or group of computer clusters 12); and request the key generation sub-system 14 to generate additional cryptographic keys 16 and corresponding labels 18 responsively to the monitored level so that newly generated cryptographic keys 16 and corresponding key labels 18 may be distributed by the QKD devices 24 among the computer clusters 12 to maintain an adequate advance supply of cached cryptographic keys 16. In some embodiments, the key cache orchestrator 36 may request additional cryptographic keys 16 (and corresponding key labels 18) to be generated by the key generation sub-system 14 of another computer cluster 12 for distribution by the QKD devices 24.

The key cache orchestrator 36 may communicate with one or more of the QKD devices 24 via any suitable communication protocol, for example, HTTPS Local Interface ESTI QKD 014.

The key cache orchestrators 36 in different computer clusters 12 may exchange key labels 18 (e.g., via encrypted data flows 44) in order to confirm that keys 16 in the possession of one key cache orchestrator 36 are also held by another key cache orchestrator 36 or other key cache orchestrators 36. If one of the key labels 18 is not found by one or more key cache orchestrators 36, the key 16 associated with that key label 18 may be invalidated by the relevant key cache orchestrator(s) 36.

In some embodiments, one or more of the key cache orchestrators 36 configures the optical switch(es) 28 of the optically-switched communication network 30 (for example, by sending commands in encrypted data flows 46) so as to allow distribution of cryptographic keys 16 by the QKD devices 24 via the configured optical switch(es) 28.

In some embodiments, the key exchange orchestrator 38 of each computer cluster 12 is configured to provide respective ones of the cached cryptographic keys 16 to the applications 22 (or software agents 34 of the applications 22) of that computer cluster 12 to enable secure communication among the applications 22 of different endpoints 20. Each agent 34 is typically a software instance running on one of the endpoints 20 (e.g., in a host device or a network interface controller) and serves one or more of the applications 22 (running on that endpoint 20) to retrieve cryptographic keys 16 from the key exchange orchestrator 38 in the computer cluster 12 in which that endpoint 20 is disposed and install the retrieved cryptographic keys 16 for use in securing communication for the application(s) 22 for which the keys 16 were retrieved and installed. The applications 22 may perform encryption and/or decryption based on the cryptographic keys 16 via corresponding application data paths 40 (in hardware and/or software), which may be processed in a network interface controller or a host device. The encrypted data is then transferred in encrypted data flows 42 between the various endpoints 20.

The key exchange orchestrator 38 of one of the computer clusters 12 is configured to manage provision of cached cryptographic keys 16 to the applications 22 running on respective one or more of the endpoints 20 in that computer cluster 12 responsively to corresponding ones of the key labels 18.

In some embodiments, the key exchange orchestrator 38 of computer cluster 12-1 is configured to communicate with the key exchange orchestrator 38 of computer cluster 12-2 (e.g., via a public unsecured channel 48) to manage the provision of one or more of the cached cryptographic keys 16 to applications 22 running on endpoints 20 in the computer clusters 12-1 and 12-2. The key exchange orchestrators 38 do not communicate the keys 16 themselves but indicate the keys 16 to be shared using the corresponding key labels 18. Therefore, the key exchange orchestrator 38 of the computer cluster 12-1 is configured to communicate with the key exchange orchestrator 38 of the computer cluster 12-2 to manage provision of cryptographic key(s) 16 using the key labels 18 of the cryptographic key(s) 16. For example, application 1 in datacenter A may request a cryptographic key 16 from the key exchange orchestrator 38 of datacenter A for communicating with application 2 in datacenter B. The request to the key exchange orchestrator 38 of datacenter A by application 1 may include one or more details about the communication (e.g., connection or session details, application ID, endpoint ID, destination ID such as destination MAC or IP address etc.). The key exchange orchestrator 38 of datacenter A may then request a key from the key cache orchestrator 36 of datacenter A. The key cache orchestrator 36 retrieves the cryptographic key 16 and corresponding key label 18 from a cache, and provides the retrieved key 16 and key label 18 to the key exchange orchestrator 38, which provides the retrieved key 16 to application 1. The key exchange orchestrator 38 of datacenter A provides the key label 18 to the key exchange orchestrator 38 of datacenter B optionally along with one or more details about the communication. The key exchange orchestrator 38 of datacenter B then requests the corresponding key 16 from the key cache orchestrator 36 of datacenter B responsively to the received key label 18. The key exchange orchestrator 38 of datacenter B may then provide the retrieved key 16 to application 2 either by pushing the key to application 2 (based on the received details from the key exchange orchestrator 38 of datacenter A) or in response to a key request from application 2.

Therefore, the key exchange orchestrator 38 of the computer cluster 12-1 is configured to provide one of the cached cryptographic keys 16 having a corresponding key label 18 to application 1 running on one of the endpoints 20 in the computer cluster 12-1 responsively to at least one detail about a communication between application 1 and application 2 running on one of the endpoints 20 in the computer cluster 12-2. The key exchange orchestrator 38 of the computer cluster 12-2 is configured to provide one of the cached cryptographic keys 16 to application 2 responsively to receiving: the key label 18 and the detail(s) about the communication from the key exchange orchestrator 38 of the computer cluster 12-1; and the detail(s) about the communication from application 2.

In some embodiments, the key exchange orchestrator 38 of datacenter A may provide the retrieved key 16 and corresponding key label 18 to application 1. Application 1 may then provide the key label 18 to application 2, which requests the corresponding key 16 from the key exchange orchestrator 38 of datacenter B using the provided key label 18. The key exchange orchestrator 38 retrieves the key 16 from the key cache orchestrator 36 responsively to the provided key label 18 and the provides the key 16 to application 2.

In some embodiments, logical instances of both key cache orchestrator 36 and key exchange orchestrator 38 run on a datacenter network protected zone and may be realized as a collection of identical processes for scale-out purposes. A datacenter may be considered as a logical instance as well in case it includes non-trusted network zones that require data encryption for safe communications and also employ QKD devices for key exchange between the zones. In some embodiments, the QKD infrastructure of the QKD orchestration system 10 aims at protecting inter-site communications over public internet so a physical datacenter will have in most cases one logical key cache orchestrator 36 and one key exchange orchestrator 38 instance.

Figure 2:
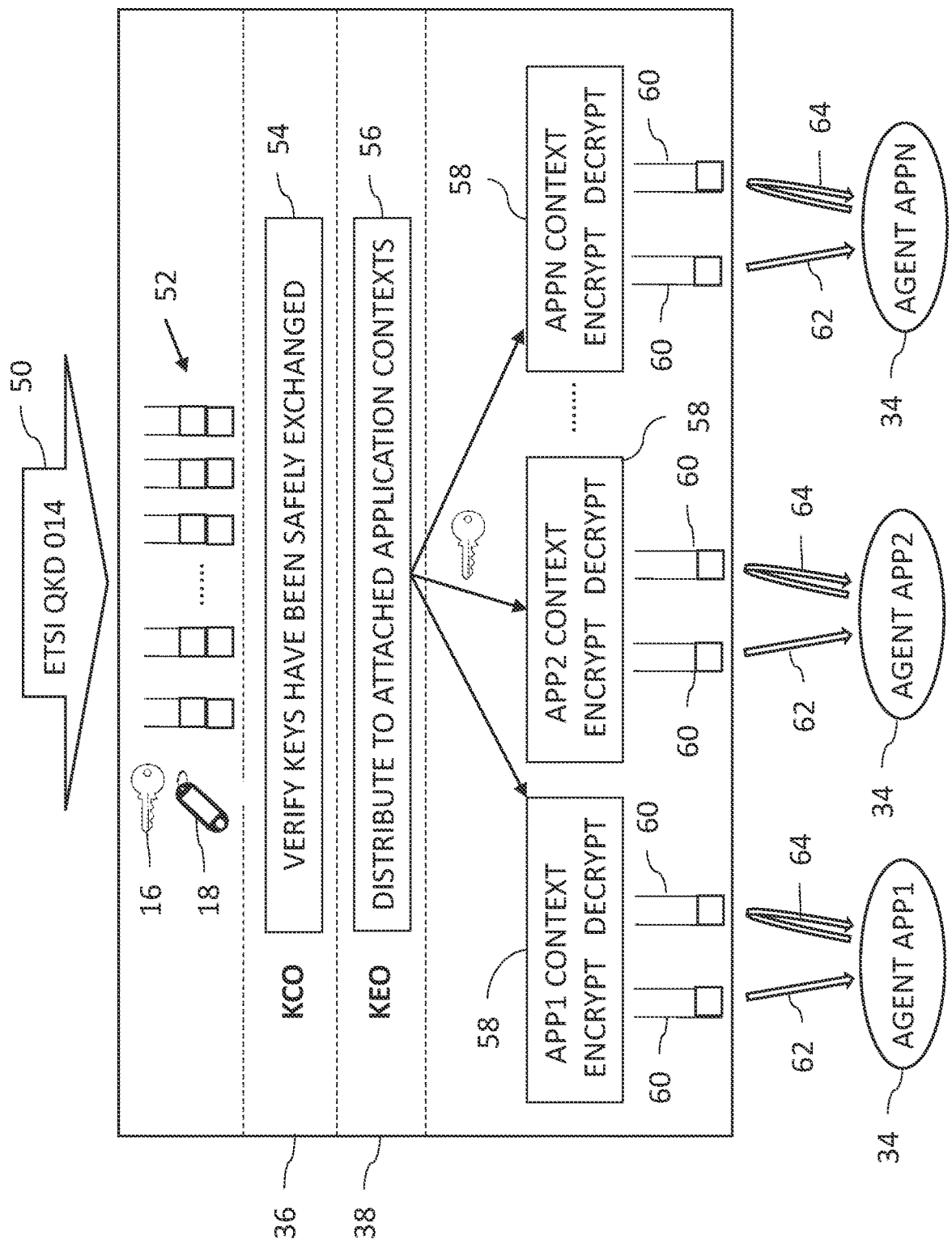
FIG. 2 is a block diagram illustrating key caching, queueing and delivery in the system of FIG. 1.

Reference is now made to FIG. 2, which is a block diagram illustrating key caching, queueing and delivery in the system 10 of FIG. 1.

The cryptographic keys 16 and the corresponding key labels 18 are received from the QKD device 24 via a suitable protocol 50 (e.g., ETSI QKD 014) and placed in queues 52 (e.g., first-in first-out (FIFO) queues) for retrieval by the key cache orchestrator 36. Key cache size may be bounded if needed by defining upper FIFO depths. If the FIFO queue of a specific device has no slots available, keys are not retrieved for that device until room is available.

The key cache orchestrator 36 is configured to retrieve the cryptographic keys 16 and key labels 18 from the queues 52 and cache the retrieved cryptographic keys 16 and key labels 18 as well as perform various tasks including verifying that the cryptographic keys 16 have been safely exchanged (block 54) with other computer clusters 12 (FIG. 1), as described previously.

The key exchange orchestrator 38 is configured to request cryptographic keys 16 and corresponding key labels 18 from the key cache orchestrator 36 to distribute (block 56) the cryptographic keys 16 to attached application contexts 58. The cryptographic keys 16 for different application contexts 58 are stored in different queues 60 with each application context 58 having a different queue 60 for encryption keys and decryption keys. Therefore, the key exchange orchestrator 38 of the computer cluster 12-1 (FIG. 1) and the key exchange orchestrator 38 of the computer cluster 12-2 etc., are configured to provide cached cryptographic keys 16 to the applications 22 (FIG. 1) running on the endpoints 20 (FIG. 1) in the computer clusters 12-1, 12-2 using the key queues 60 in which respective ones of the cached cryptographic keys 16 are queued in a key queue or queues in the computer cluster 12-1 and in a key queue or queues in the computer cluster 12-2.

The agents 34 for the respective application contexts 58 may pull keys 16 (arrows 62) from the queues 60 or cryptographic keys 16 may be pushed (arrows 64) to the agents 34 (e.g., via an interrupt). In some embodiments, decryptions keys are pulled by the agents 34 and encryption keys are pushed to the agents 34. In some embodiments, for a given application context 58, the decryption key is installed prior to an encryption key. Therefore, in some embodiments, the key exchange orchestrator 38 of the computer cluster 12-1 (FIG. 1) and the key exchange orchestrator 38 of the computer cluster 12-2 etc., are configured to manage the provision of the cryptographic keys 16 to applications 22 (FIG. 1) running on the endpoints 20 in the computer clusters 12-1, 12-2 such that an encryption key of the cached cryptographic keys 16 is not provided to one of the endpoints 20 (e.g., to the agent 34 of that endpoint 20) until a decryption key (corresponding with the encryption key) is provided to another one of the endpoints 20 (e.g., to the agents 34 of that endpoint 20).

The delivery of keys may be decryption key driven for OSI layer 2 and CSI layer 3 applications and encryption key driven for OSI layer 4 applications (typically SSL). With OSI Layer 2/3 applications which establish encrypted tunnels without any notion of connection semantics between the endpoints 20, there is generally no in-band notification mechanism available to let the other side know which key 16 will be used. This coordination is expected to be lifted by a control plane. The key exchange orchestrator 38 undertakes this role by making sure that decryption keys get installed first at the decryption side before any encryption key is provided at the encryption side.

On the other hand, OSI layer 4 applications have connection semantics, and in that case the key labels 18 of the key is provided by key exchange orchestrator 38 at the side that initiates the connection, the key label 18 being transmitted in-band as part of the connection establishment steps to the side that accepts the connection. Therefore, the key exchange is encryption/authentication side driven, and the key exchange orchestrator 38 employs a mechanism to make the keys 16 available to both endpoints 20 as fast as possible.

In some embodiments, the key exchange orchestrator 38 features a proactive mechanism called Proactive Key Installation (PKI). PKI requires that all cryptographic applications, register a key context with the key exchange orchestrator 38, letting the key exchange orchestrator 38 know that they will need keys for establishment of secure communications with specific endpoints 20. This request is issued to the local KEO agent 34 which returns a unique identifier to the application 20 for future key requests. As soon as a context is created, the key exchange orchestrator 38 proactively exchanges keys with the other side and fills in the relevant agent FIFOs so applications do not have to wait when they actually need the keys. Therefore, PKI introduces a small first level cache to further accelerate the key installation/update process.

Figure 3:
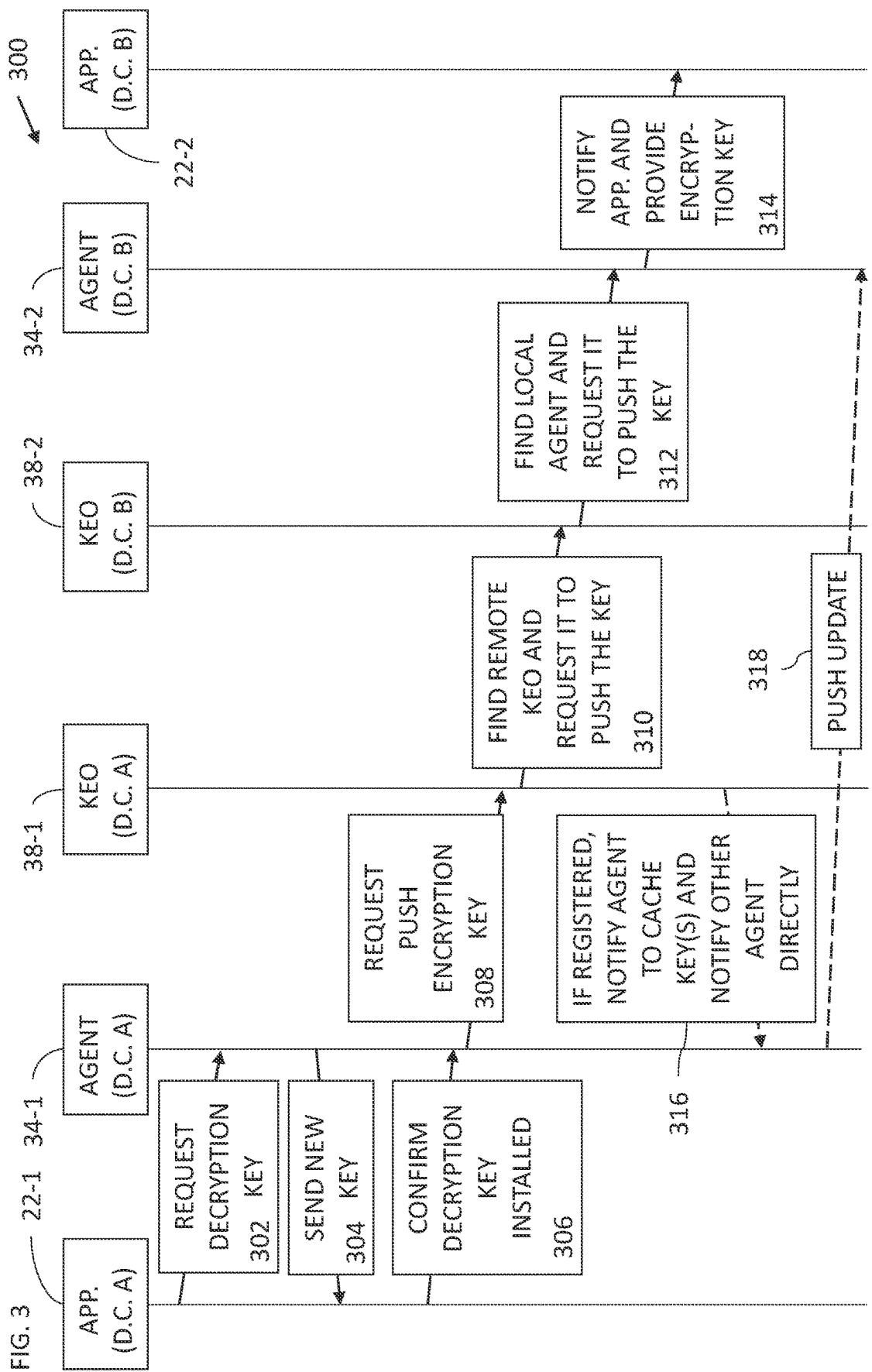
FIG. 3 is a flowchart including steps in proactive key installation and update interactions in the system of FIG. 1.

Reference is now made to FIG. 3, which is a flowchart 300 including steps in proactive key installation and update interactions in the system 10 of FIG. 1. FIG. 3 shows the main interaction of PKI mode of the key exchange orchestrator 38. Reference is also made to FIG. 1.

The initiator for proactive caching is a key exchange orchestrator 38-1 that retrieves a decryption-side cryptographic key 16 from the key cache orchestrator 36 (FIG. 1) in the same computer cluster 12-1, e.g., Datacenter A (D.C. A), as the key exchange orchestrator 38. A key exchange orchestrator 38 in the computer cluster 12-2, e.g., Datacenter B (D.C. B) has previously made available the same key 16 that can be used for encryption at the remote endpoint 20 in computer cluster 12-2. The key exchange orchestrator 38-1 in datacenter A informs the key exchange orchestrator 38-2 in datacenter B to retrieve that cryptographic key 16 by providing its key label 18. Subsequently, the key exchange orchestrator 38-2 in datacenter B assigns the key 16 to an application encryption context and then informs the initiator key exchange orchestrator 38-1 in datacenter A to assign the cryptographic keys 16 as a decryption key to a specific application context in datacenter A. This way, whenever an application gets a decryption key, it is certain that the encryption counterpart is already available at the edge of the other side and with a simple notification the cryptographic key 16 is installed.

The above is now described in some more detail. An application 22-1 running on one of the endpoints 20 in datacenter A requests a decryption key from an agent 34-1 of the application 22-1 (block 302). The agent 34-1 sends a new key 16 to the application 22-1 (block 304), The application 22-1 confirms that the decryption key has been installed (block 306). The agent 34-1 requests pushing a corresponding encryption key by the key exchange orchestrator 38-1 (block 308). The key exchange orchestrator 38-1 finds the remote key exchange orchestrator 38-2 and requests it to push the key (block 310). The key exchange orchestrator 38-2 finds a local agent 34-2 and requests it to push the key 16 to the application (block 312). The agent 34-2 notifies an application 22-2 and provides the encryption key (block 314). If the agent is registered for key updates, the key exchange orchestrator 38-1 notifies the agent 34-1 to cache key(s) 16 and notify the other agent 34-2 directly (block 316). The agent 34-1 is configured to push the key update directly to the agent 34-2 (block 318).

Figure 4:
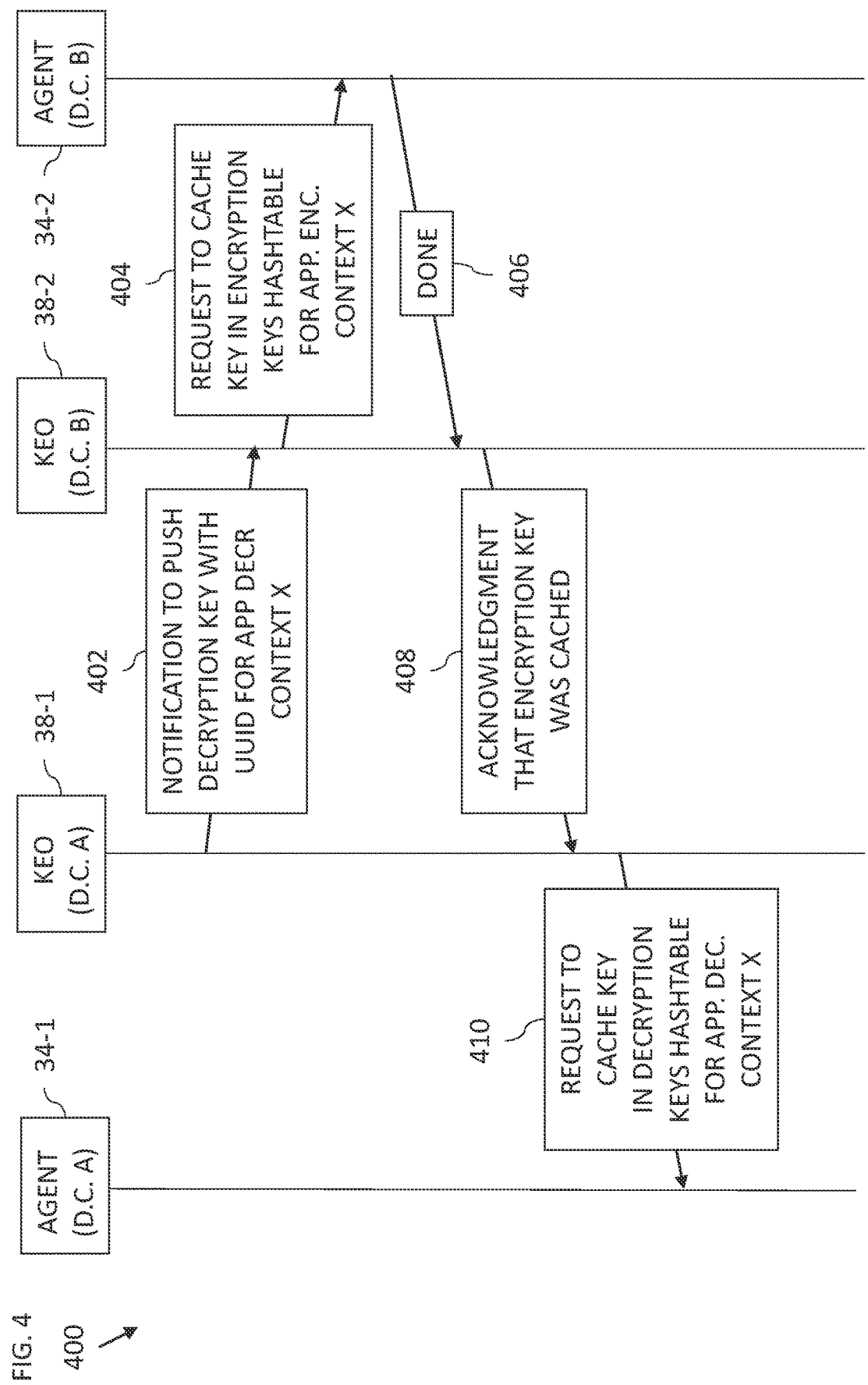
FIG. 4 is a flowchart including steps in key update interaction in the system of FIG. 1.

Reference is now made to FIG. 4, which is a flowchart 400 including steps in key update interaction in the system 10 of FIG. 1. Reference is also made to FIG. 1. In accordance with the PKI operation, FIG. 4 illustrates an interaction for symmetric cryptography applications key update for OSI layers 2 and 3, after initial secure tunnel establishment takes place. FIG. 4 highlights the decryption key-driven approach, where the process is initiated because a new decryption key is installed at the decryption side. All tunnel decrypter data-paths allow more than one security association to be used concurrently at the decryption side and therefore it is advantageous in some embodiments that key update starts from the decryption key. As soon as the encryption key is installed, the encryption key may be used as the decryption side already has the information needed to decrypt.

The key exchange orchestrator 38-1 sends (block 402) a notification to the key exchange orchestrator 38-2 to push a decryption key 16 with a corresponding key label 18 (e.g., UUID) for an application decryption context X (which is being served by agent 34-1). The key exchange orchestrator 38-2 sends (block 404) a request to the agent 34-2 to cache an encryption key 16 (corresponding to the decryption key) in the encryption keys hash table for application encryption context X. The agent 34-2 sends (block 406) an acknowledgement to the key exchange orchestrator 38-2 that the caching of the encryption key 16 has been performed. The key exchange orchestrator 38-2 sends (block 408) to the key exchange orchestrator 38-1 an acknowledgment that the encryption key 16 was cached. The key exchange orchestrator 38-1 sends (block 410) a request to the agent 34-1 to cache the decryption key 16 in the decryption key hash table for the application decryption context X.

Figure 5:
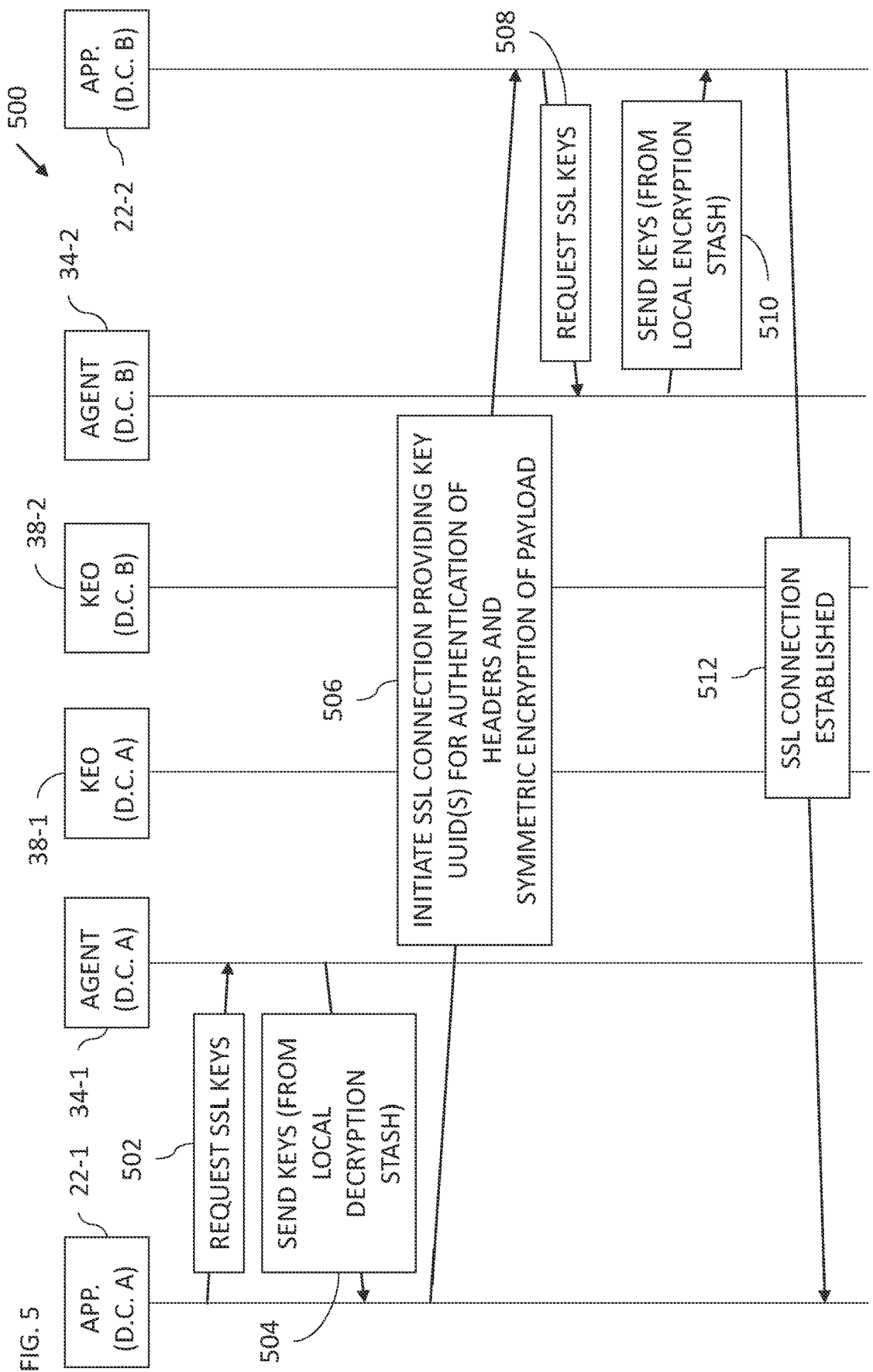
FIG. 5 is a flowchart including steps in connection establishment in the system of FIG. 1.

Reference is now made to FIG. 5, which is a flowchart 500 including steps in SSL connection establishment in the system 10 of FIG. 1. FIG. 5 depicts the interactions for SSL channel establishment in accordance with PKI operation. The decryption-key-first approach described above with reference to FIGS. 3 and 4, is now reversed to an encryption-key-first approach. For implementation simplicity the decryption keys may be retrieved by the decryption key FIFOs maintained by the local agent 34 for the specific application context. The Secure Socket Layer is significantly modified to leverage QKD and drops the public key cryptography functionality, as the public key functionality is undertaken by the trusted KEO and KCO services. Taking advantage of the connection establishment steps, the key label(s) 18 (e.g., UUID) of the QKD-provided key(s) 16 that is going to be used is relayed to the other endpoint during handshaking, which subsequently retrieves the corresponding key(s) 16 from the local agent encryption PKI. If KCO and KEO Proactive Key Installation has enough bandwidth to provide applications with keys 16 in advance, the extra delay of exchanging keys 16 for secure connection establishment may be negligible.

Application 22-1 requests SSL keys from the agent 34-1 (block 502). The agent 34-1 sends the SSL keys from a local decryption stash to application 22-1 (block 504). Application 22-1 initiates an SSL connection and provides the key labels 18 (e.g., UUIDs) of the SSL keys to application 22-2 for authentication of headers and symmetric encryption of payload (block 506). Application 22-2 requests SSL keys from agent 34-2 (block 508). The agent 34-2 sends the SSL keys from the local encryption stash to application 22-2 (block 510). Application 22-2 establishes an SSL connection with application 22-1 (block 512).

Therefore, in some embodiments, the key exchange orchestrator 38-1 of the computer cluster 12-1 is configured to provide (via the agent 34-1) one or more of the cached cryptographic keys 16 and corresponding one or more of the labels 18 to the application 22-1 running on one of the endpoints 20 in the computer cluster 12-1. The key exchange orchestrator 38-2 of the computer cluster 12-2 is configured to provide (via the agent 34-2) one or more of the cached cryptographic keys 16 to the application 22-2 running on one of the endpoints 20 in the computer cluster 12-2 responsively to receiving the label(s) 18 from the application 22-2, which received the label(s) 18 from the application 22-1.

Figure 6:
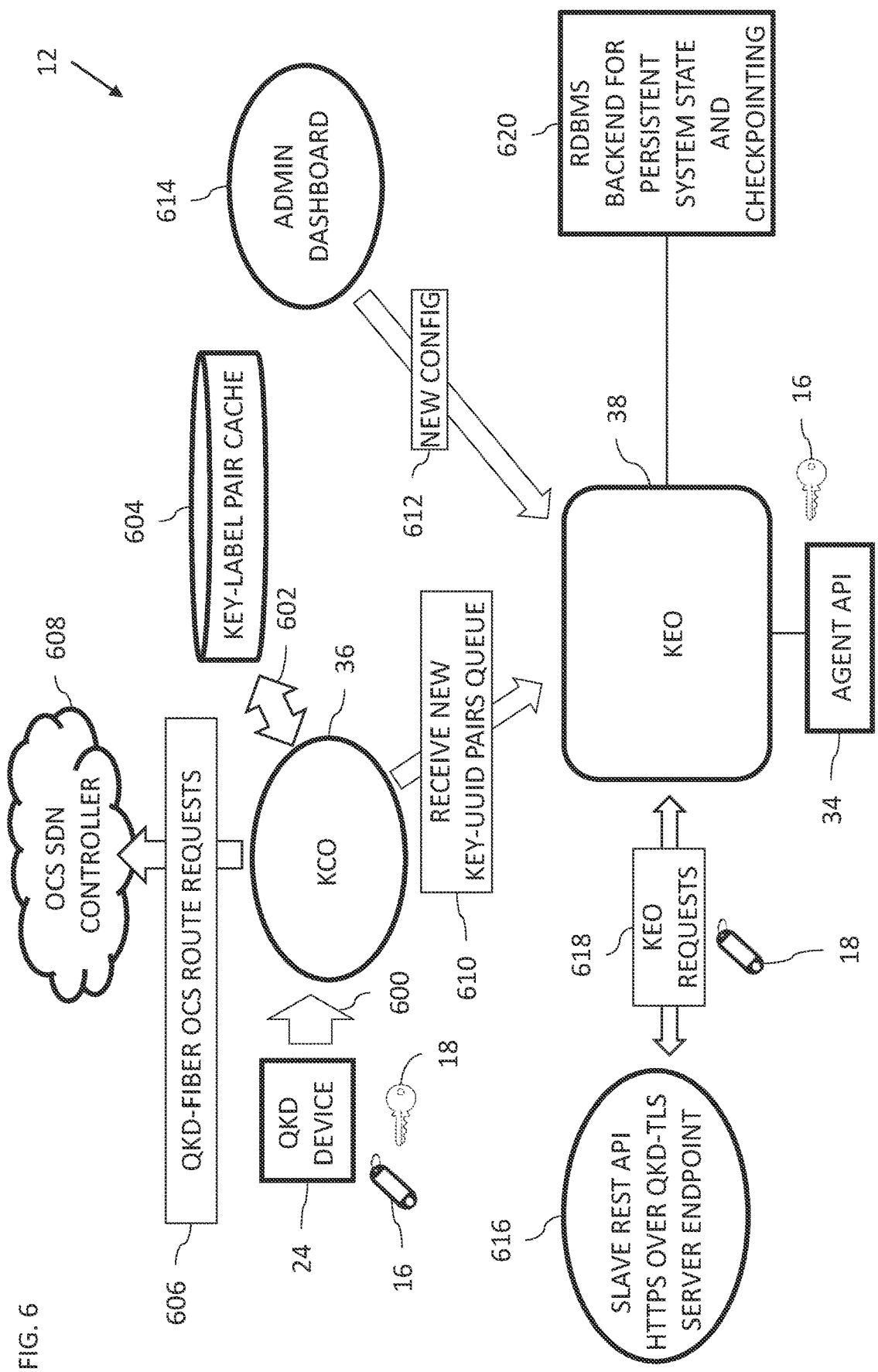
FIG. 6 is a block diagram including components of the system of FIG. 1.

Reference is now made to FIG. 6, which is a block diagram including components of the system 10 of FIG. 1. In FIG. 6, an example KEO and KCO controller architecture is depicted, to highlight basic functionality and service integration included in some embodiments of the present invention. FIG. 6 shows one key cache orchestrator 36 and one key exchange orchestrator 38 in one of the computer clusters 12 and how the key cache orchestrator 36 and the key exchange orchestrator 38 interact with each other and elements internal to, and external to, that computer cluster 12.

The key cache orchestrator 36 receives (arrow 600) the cryptographic keys 16 and key labels 18 from the QKD devices 24. The key cache orchestrator 36 stores (arrow 602) the received cryptographic keys 16 and key labels 18 in a key-label pair cache 604, The key cache orchestrator 36 also generates requests 606 to an optical control system software-defined networking (OCS SDN) controller 608 which allows the optical switch(es) 28 (FIG. 1) to be programmed to generate relevant optical circuit connections between the QKD devices 24 (FIG. 1). The key cache orchestrator 36 retrieves cryptographic keys 16 and key labels 18 from the key-label pair cache 604 and provides the retrieved cryptographic keys 16 and key labels 18 for receipt (block 610) by the key exchange orchestrator 38.

The key exchange orchestrator 38 may receive new configurations 612 from an admin dashboard 614, for example, to enable the key exchange orchestrator 38 to communicate with other key exchange orchestrators 38, The key exchange orchestrator 38 sends and receives KEO requests 618 (referencing key labels 18), to and from, other key exchange orchestrators 38 via a suitable protocol 616 such as Slave REST API HTTPS over QKD-TLS Server Endpoint. The key exchange orchestrator 38 also supplies keys 16 to one or more agents 34. The key exchange orchestrator 38 may use a relational database 620, which stores the system state, which may be used if the system crashes.

Figure 7:
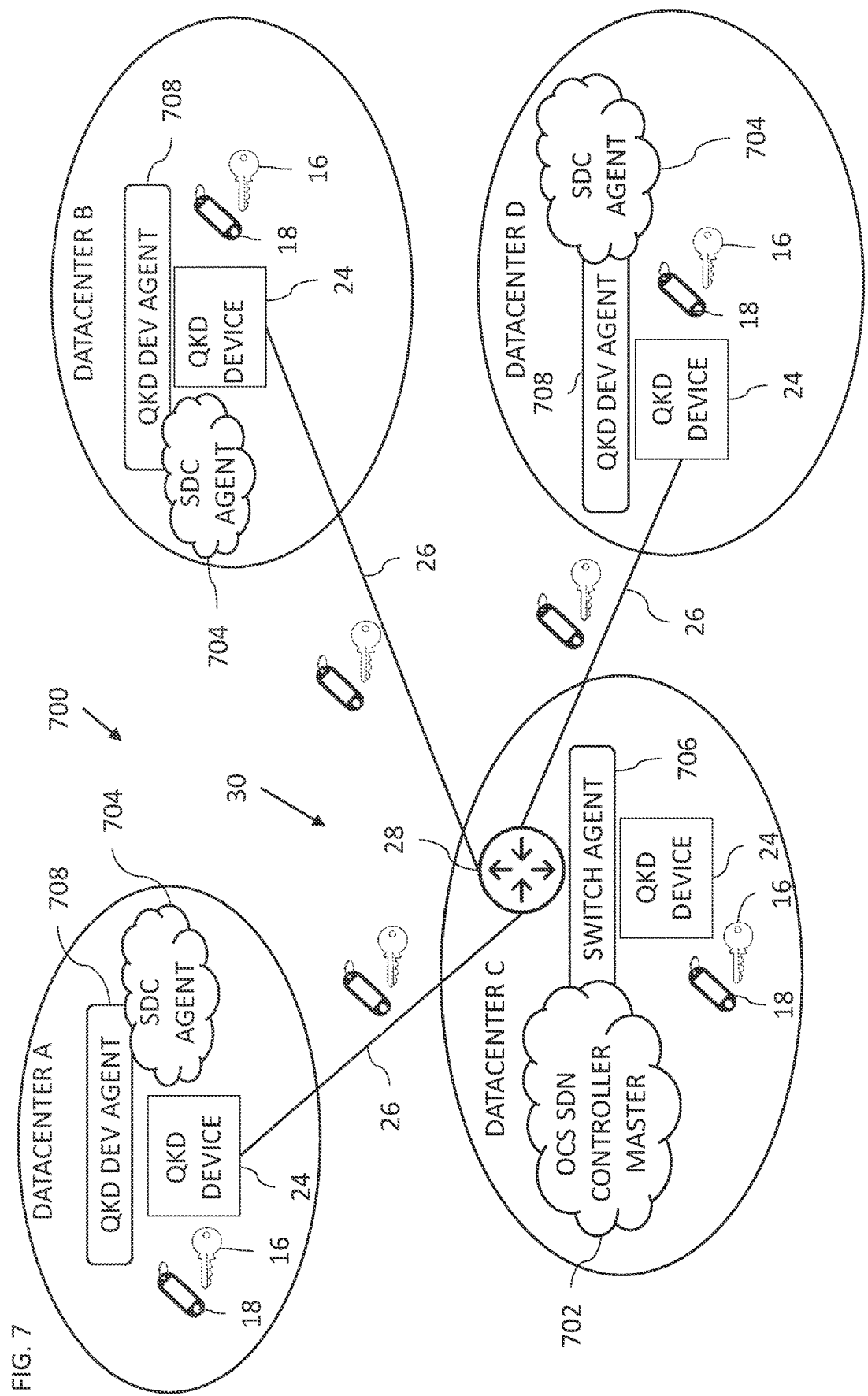
FIG. 7 is a block diagram of an optical switching software-defined key exchange system constructed and operative in accordance with an embodiment of the present invention.

Reference is now made to FIG. 7, which is a block diagram of an optical switching software-defined key exchange system 700 constructed and operative in accordance with an embodiment of the present invention.

FIG. 7 depicts an Optical Circuit Switched infrastructure to enable each QKD device 24 to flexibly interface more endpoints at various computer clusters 12 (e.g., datacenter sites, as shown in FIG. 7). The optical switching software-defined key exchange system 700 includes the QKD devices 24 configured to distribute cryptographic keys 16 (only some are labeled for the sake of simplicity) and optionally key labels 18 (only some are labeled for the sake of simplicity). The optical switching software-defined key exchange system 700 includes the optical switch(es) 28 configured to switch beams of light which are modulated to carry information. The optical switching software-defined key exchange system 700 includes optical fiber connections 26 connecting the optical switch(es) 28 and the QKD devices 24 forming the optically-switched communication network 30, over which optical circuit connections are established between pairs of the QKD devices 24 over respective ones of the optical fiber connections 26 via the optical switch(es) 28. The optically-switched communication network 30 includes the QKD devices 24 and the optical switch(es) 28.

One or more selected datacenter sites host one or more optical circuit switches 28 that can be flexibly configured to selectively interface the QKD devices 24 located at different sites. A selected site runs an OCS SDN controller master 702 that can configure the local and remote switch(es) optical dataplane(s) to interface different QKD devices 24. More specifically, the OCS SDN master controller 702: (a) receives route setup commands from one of the key cache orchestrators 36; (b) schedules appropriately QKD circuit setup to optimize existing QKD hardware infrastructure for the given traffic (the key cache orchestrator 36 may send schedules reactively to the status of the key caches or proactively and apply different methods for short or long-term key demand prediction); and (c) distribute the schedule (along with timing information, if needed) to the local switch SDN agents 704 (SDC-Agents).

Each optical switch 28 runs a local agent 706 to register with the OCS control plane and advertise: (a) the capabilities of the attached optical switch 28, if any (e.g., wavelength selectivity); (b) receive the switching schedule from the OCS SDN controller master 702 and translate the switching schedule into the appropriate configuration of the attached QKD and optical switch hardware and associated software.

The optical switching software-defined key exchange system 700 also includes QKD dev agents 708 to activate and deactivate connections between the QKD devices 24.

Each QKD device 24 also has a QKD SDN agent (which may be included in the functionality of the QKD dev agent 708) that advertises the capabilities of the attached QKD device(s) (e.g., part number, CV-QKD vs DV-QKD, wavelength) to ensure compatibility of QKD equipment in the established QKD light paths.

Each site without any OCS physical devices includes one of the SDN controller agents 704 that requests changes from remote switches via the OCS SDN controller master 702, so the interactions with the SDN layer remain uniform from the perspective of the key cache orchestrators 36. The SDN layer is aware of the physical topology of the cross-data-center OCS infrastructure and the QKD devices 24, and handles circuit setup requests that come from the key cache orchestrator(s) 36 that decide which QKD devices 24 should exchange keys at any given point in time, OCS SDN plane tasks include QKD device link bring up and relevant steps required to put the links in working order.

In practice, some or all of the functions of the key cache orchestrators 36, key exchange orchestrators 38, the agents 34, may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub combinations of the various features described hereinabove, as well as variations and modifications thereof which would occur to persons skilled in the art upon reading the foregoing description and which are not disclosed in the prior art.

What is claimed is:

1. A secure computing system, comprising:
  a key generation sub-system configured to generate cryptographic keys and corresponding key labels for distribution to computer clusters, each computer cluster including a plurality of respective endpoints;
  a plurality of quantum key distribution (QKD) devices connected via respective optical fiber connections, and configured to securely distribute the generated cryptographic keys among the computer clusters; and
  a key orchestration sub-system configured to:
    manage caching of the cryptographic keys in the computer clusters in advance of receiving key requests from applications running on ones of the endpoints in ones of the computer clusters; and
    provide respective ones of the cached cryptographic keys, cached in the computer clusters in advance of receiving the key requests from the applications, to the applications to enable secure communication among the applications running on the ones of the endpoints, wherein the key orchestration sub-system includes, in each respective computer cluster, a key cache orchestrator and a key exchange orchestrator, which is configured to manage provision of the cached cryptographic keys to the applications running on respective ones of the endpoints in the computer clusters responsively to corresponding ones of the key labels.

2. The system according to claim 1, wherein the key cache orchestrator is configured to:
  monitor a level of available cryptographic keys in a respective one of the computer clusters; and
  request the key generation sub-system to generate additional cryptographic keys and corresponding labels responsively to the monitored level.

3. The system according to claim 1, wherein the key exchange orchestrator of a first one of the computer clusters is configured to communicate with the key exchange orchestrator of a second one of the computer clusters to manage the provision of one or more of the cached cryptographic keys to applications running on endpoints in the first and second computer clusters.

4. The system according to claim 3, wherein the key exchange orchestrator of the first computer cluster is configured to communicate with the key exchange orchestrator of the second computer cluster to manage provision of the one or more cryptographic keys using the labels of the one or more cryptographic keys.

5. The system according to claim 3, wherein the key exchange orchestrator of the first computer cluster and the key exchange orchestrator of the second computer cluster are configured to manage the provision of the one or more cached cryptographic keys to applications running on the endpoints in the first and second computer clusters such that an encryption key of the one or more cached cryptographic keys is not provided to one of the endpoints until a decryption key corresponding with the encryption key is provided to another one of the endpoints.

6. The system according to claim 3, wherein the key exchange orchestrator of the first computer cluster and the key exchange orchestrator of the second computer cluster are configured to provide ones of the cached cryptographic keys to the applications running on the endpoints in the first and second computer clusters using key queues in which respective ones of the cached cryptographic keys are queued in a first key queue in the first computer cluster and in a second key queue in the second computer cluster.

7. The system according to claim 3, wherein: the key exchange orchestrator of the first computer cluster is configured to provide one of the cached cryptographic keys having a first corresponding one of the labels to a first application running on a first one of the endpoints in the first computer cluster responsively to at least one detail about a communication between the first application and a second application running on a second one of the endpoints in the second computer cluster; and
  the key exchange orchestrator of the second computer cluster is configured to provide one of the cached cryptographic keys to the second application responsively to receiving: the first label and the at least one detail from the key exchange orchestrator of the first computer cluster; and the at least one detail from the second application.

8. The system according to claim 1, wherein:
the key exchange orchestrator of a first one of the computer clusters is configured to provide one of the cached cryptographic keys and a first corresponding one of the labels to a first application running on a first one of the endpoints in the first computer cluster; and
the key exchange orchestrator of a second one of the computer clusters is configured to provide one of the cached cryptographic keys to a second application running on a second one of the endpoints in the second computer cluster responsively to receiving the first label from the second application, which received the first label from the first application.

9. A secure computing system, for use with a plurality of computing sub-systems, each computing sub-system including a plurality of endpoints, the secure computing system comprising:
a key generation sub-system configured to generate cryptographic keys and corresponding key labels for distribution to the computer sub-systems;
a plurality of quantum key distribution (QKD) devices connected via respective optical fiber connections, and configured to securely distribute the generated cryptographic keys among the computer sub-systems; and
a key orchestration sub-system configured to:
manage caching of the cryptographic keys in the computing sub-systems in advance of receiving key requests from applications running on ones of the endpoints in ones of the computing sub-systems; and
provide respective ones of the cached cryptographic keys, cached in the computing sub-systems in advance of receiving the key requests from the applications, to the applications to enable secure communication among the applications running on ones of the endpoints, wherein the key orchestration sub-system includes, in each respective computer sub-system a key cache orchestrator and a key exchange orchestrator, which is configured to manage provision of the cached cryptographic keys to the applications running on respective ones of the endpoints in the computer sub-systems responsively to corresponding ones of the key labels.

10. A secure computing method, comprising:
generating cryptographic keys and corresponding key labels for distribution to computer clusters, each computer cluster including a plurality of respective endpoints;
securely distributing the generated cryptographic keys among the computer clusters by a plurality of quantum key distribution (QKD) devices connected via respective optical fiber connections;
managing caching of the cryptographic keys in the computer clusters in advance of receiving key requests from applications running on ones of the endpoints in ones of the computer clusters;
providing respective ones of the cached cryptographic keys, cached in the computer clusters in advance of receiving the key requests from the applications, to the applications to enable secure communication among the applications running on ones of the endpoints; and
in each respective computer cluster, managing provision of the cached cryptographic keys to the applications running on respective ones of the endpoints in the computer clusters responsively to corresponding ones of the labels.

11. The method according to claim 10, further comprising:
monitoring a level of available cryptographic keys in a respective one of the computer clusters; and
requesting generation of additional cryptographic keys and corresponding labels responsively to the monitored level.

12. The method according to claim 10, further comprising a first one of the computer clusters communicating with a second one of the computer clusters to manage the provision of one or more of the cached cryptographic keys to applications running on endpoints in the first and second computer clusters.

13. The method according to claim 12, further comprising the first computer cluster communicating with the second computer cluster to manage provision of the one or more cryptographic keys using the labels of the one or more cryptographic keys.

14. The method according to claim 12, further comprising managing the provision of the one or more cached cryptographic keys to applications running on the endpoints in the first and second computer clusters such that an encryption key of the one or more cached cryptographic keys is not provided to one of the endpoints until a decryption key corresponding with the encryption key is provided to another one of the endpoints.

15. The method according to claim 12, further comprising providing ones of the cached cryptographic keys to the applications running on the endpoints in the first and second computer clusters using key queues in which respective ones of the cached cryptographic keys are queued in a first key queue in the first computer cluster and in a second key queue in the second computer cluster.

16. The method according to claim 12, further comprising:
providing one of the cached cryptographic keys having a first corresponding one of the labels to a first application running on a first one of the endpoints in the first computer cluster responsively to at least one detail about a communication between the first application and a second application running on a second one of the endpoints in the second computer cluster; and
providing one of the cached cryptographic keys to the second application responsively to receiving the first label and the at least one detail.

17. The method according to claim 10, further comprising:
providing one of the cached cryptographic keys and a first corresponding one of the labels to a first application running on a first one of the endpoints in the first computer cluster; and
providing one of the cached cryptographic keys to a second application running on a second one of the endpoints in the second computer cluster responsively to receiving the first label from the second application, which received the first label from the first application.

* * * * *